(12) United States Patent
Kaldor et al.

(10) Patent No.: US 9,291,105 B2
(45) Date of Patent: Mar. 22, 2016

(54) UTILITY VEHICLE HORSEPOWER MANAGEMENT

(71) Applicant: Clark Equipment Company, West Fargo, ND (US)

(72) Inventors: Matthew J. Kaldor, Bismarck, ND (US); Brian Dehnert, Mandan, ND (US)

(73) Assignee: Clark Equipment Company, West Fargo, ND (US)

( * ) Notice: Subject to any disclaimer, the term of this patent is extended or adjusted under 35 U.S.C. 154(b) by 371 days.

(21) Appl. No.: 13/730,208

(22) Filed: Dec. 28, 2012

(65) Prior Publication Data

US 2014/0060487 A1 Mar. 6, 2014

Related U.S. Application Data

(60) Provisional application No. 61/696,583, filed on Sep. 4, 2012.

(51) Int. Cl.
*B60W 10/06* (2006.01)
*F02D 1/00* (2006.01)
(Continued)

(52) U.S. Cl.
CPC ............. *F02D 1/00* (2013.01); *E02F 9/2004* (2013.01); *E02F 9/2066* (2013.01); *E02F 9/2235* (2013.01); *E02F 9/2296* (2013.01); *F16H 61/437* (2013.01); *B60K 2026/029* (2013.01)

(58) Field of Classification Search
CPC ........ E02F 9/2246; F04B 49/20; B60W 10/06
USPC ........... 123/339.18, 198 C; 60/431, 433, 434; 417/43, 326, 364
See application file for complete search history.

(56) References Cited

U.S. PATENT DOCUMENTS

| 2,589,850 | A |   | 3/1952 | Orelind et al. |
| 3,370,424 | A | * | 2/1968 | Swanson et al. ................ 60/492 |

(Continued)

FOREIGN PATENT DOCUMENTS

| EP | 0228707 A1 | 7/1987 |
| EP | 2444637 A1 | 4/2012 |

(Continued)

OTHER PUBLICATIONS

Translation of Kanefuji (JP2718027).*

(Continued)

*Primary Examiner* — Lindsay Low
*Assistant Examiner* — Robert Werner
(74) *Attorney, Agent, or Firm* — John D. Veldhuis-Kroeze; Westman, Champlin & Koehler, P.A.

(57) ABSTRACT

Disclosed are horsepower management systems and methods for use on power machines with an engine that powers a drive system. An engine speed control device controls the engine speed. A variable displacement drive pump controlled by a displacement control member provides pressurized fluid to a drive motor. A control system communicates with the engine speed control device and the pump displacement control member. The control system includes a user input device and a command lever rotatably coupled to the displacement control member and capable of receiving the user input. The command lever provides a signal to the engine speed control device in response to the user input. The command lever also commands a given displacement via the displacement control member subject to load forces on the hydrostatic pump transmitted to a limiting mechanism coupled to the command lever and the displacement control member.

20 Claims, 8 Drawing Sheets

(51) Int. Cl.
  *E02F 9/20* (2006.01)
  *E02F 9/22* (2006.01)
  *F16H 61/437* (2010.01)
  *B60K 26/02* (2006.01)

(56) References Cited

U.S. PATENT DOCUMENTS

| | | |
|---|---|---|
| 3,443,656 A | 5/1969 | Stolz |
| 3,450,224 A | 6/1969 | Griesenbrock |
| 3,463,087 A | 8/1969 | Grant |
| 3,803,844 A * | 4/1974 | Gatiss ............... 60/491 |
| 3,853,272 A * | 12/1974 | Decker et al. ............ 239/155 |
| 3,864,914 A * | 2/1975 | Timmins ............ B60W 30/18 417/15 |
| 4,011,768 A | 3/1977 | Tessenske |
| 4,130,025 A | 12/1978 | Dawson |
| 4,726,186 A * | 2/1988 | Tatsumi et al. ............ 60/434 |
| 4,776,751 A | 10/1988 | Saele |
| 5,122,037 A | 6/1992 | Myers et al. |
| 5,131,483 A | 7/1992 | Parkes |
| 5,197,347 A | 3/1993 | Moffitt et al. |
| 5,378,127 A | 1/1995 | Welscher |
| 5,427,216 A | 6/1995 | Hoch |
| 5,463,803 A | 11/1995 | Welscher |
| 5,586,955 A | 12/1996 | Wanie |
| 6,119,456 A | 9/2000 | Louis et al. |
| 6,374,702 B1 | 4/2002 | Scheid et al. |
| 6,487,935 B2 | 12/2002 | Hauser et al. |
| 6,935,106 B2 | 8/2005 | Korthals |
| 7,240,487 B2 * | 7/2007 | Diaz et al. ............... 60/431 |
| 7,353,651 B2 | 4/2008 | Adkins et al. |
| 7,503,173 B2 | 3/2009 | Dong et al. |
| 8,205,539 B2 * | 6/2012 | Kisse et al. ............... 92/12.2 |
| 2012/0275933 A1 * | 11/2012 | Richardson et al. ......... 417/212 |

FOREIGN PATENT DOCUMENTS

| | | | | |
|---|---|---|---|---|
| JP | 58220984 A * | 12/1983 | ............ | F04B 49/00 |
| JP | 2718027 B2 * | 8/1988 | ............ | F16H 39/46 |
| WO | 2008112198 A1 | 9/2008 | | |

OTHER PUBLICATIONS

Search Report and Written Opinion dated May 16, 2013 for International Application No. PCT/US2012/072048, filed Dec. 28, 2012, 9 pages.

* cited by examiner

UTILITY VEHICLE HORSEPOWER MANAGEMENT

CROSS-REFERENCE TO RELATED APPLICATION

This application claims the benefit of U.S. Provisional Patent Application 61/696,583 filed on Sep. 4, 2012, the contents of which are incorporated by reference into this application in their entirety.

BACKGROUND

Power machine manufacturers produce a number of vehicles with hydrostatic drive systems powered by an internal combustion engine, including skid steer loaders, track loaders, excavators, and utility vehicles. Some machines, such as skid steer loaders, have traditionally controlled drive pumps by stroking the pumps directly via linkages from control inputs such as steering levers without any sort of input or control of engine speed, other than with a manual throttle that is used to set engine speed and is independent of any drive control mechanism.

It has long been known that in certain high load conditions, such as digging, carrying heavy loads over uneven terrain or towing can result in an excessively high load on the engine, causing the engine to bog down. If the load is not reduced, the engine will stop. In machines such as skid steer loaders, an experienced operator would compensate by reducing the input on the hydrostatic drive pumps by de-stroking the travel control input devices. While this approach does work to reduce loads, even the most experienced operators cannot employ this technique to operate machines at peak efficiency.

The discussion above is merely provided for general background information and is not intended to be used as an aid in determining the scope of the claimed subject matter.

SUMMARY

Disclosed are utility vehicles, and horsepower management systems and methods for use thereon, which provide improved control of a drive pump under heavy load conditions to prevent excessive load on the engine during such conditions.

In one embodiment, a power machine having an engine and a drive system is disclosed. The power machine has an engine speed control device coupled to the engine for controlling engine speed. The drive system includes a variable displacement drive pump driven by the engine. The drive system has a swash plate positionable by a rotatable actuator coupled to the swash plate for controlling displacement of the drive pump. A drive motor receives pressurized fluid from the drive pump. A control system is configured to communicate with the engine speed control device and the pump displacement control member. A user input device provides a user input signal, which is received by a command lever that is rotatably coupled to the rotatable actuator. The command lever provides an engine speed command signal to the engine speed control device in response to the user input. A displacement control lever fixed to the rotatable actuator and a limiting mechanism is coupled to the command lever and the displacement control lever. The command lever commands a given displacement of the drive pump via the displacement in response to actuation of the user input, subject to load forces on the hydrostatic pump transmitted to the command lever via the limiting mechanism.

In another embodiment, a control system for controlling an engine and a hydrostatic pump of a power machine is disclosed. The rotational speed of the engine is controlled by an engine speed control device in response to a user input, and displacement of the hydrostatic pump is controlled by a position of a swash plate actuated by a rotatable actuator. A command lever is rotatably coupled to the rotatable actuator and is coupled to the user input and to the engine speed control device such that movement of the user input causes rotational movement of the command lever about the first axis and thereby causes the engine speed control device to change the engine speed. A pintle lever is fixed to the rotatable actuator such that rotation of the pintle lever controls the position of the swash plate. A spring mechanism couples the command lever to the pintle lever such that when the command lever is rotated by movement of the user input, the pintle lever is rotated to change the displacement of the hydrostatic pump subject to load forces on the hydrostatic pump transmitted to the spring mechanism that limit rotation of the pintle lever.

This Summary is provided to introduce a selection of concepts in a simplified form that are further described below in the Detailed Description.

DETAILED DESCRIPTION

Before any embodiments of the invention are explained in detail, it is to be understood that the concepts disclosed herein are not limited in their application to the details of construction and the arrangement of components set forth in the following description or illustrated in the following drawings. The concepts illustrated in these embodiments are capable of being practiced or of being carried out in various ways. The phraseology and terminology used herein is for the purpose of description and should not be regarded as limiting. Words such as "including," "comprising," and "having" and variations thereof herein are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

Figure 1:
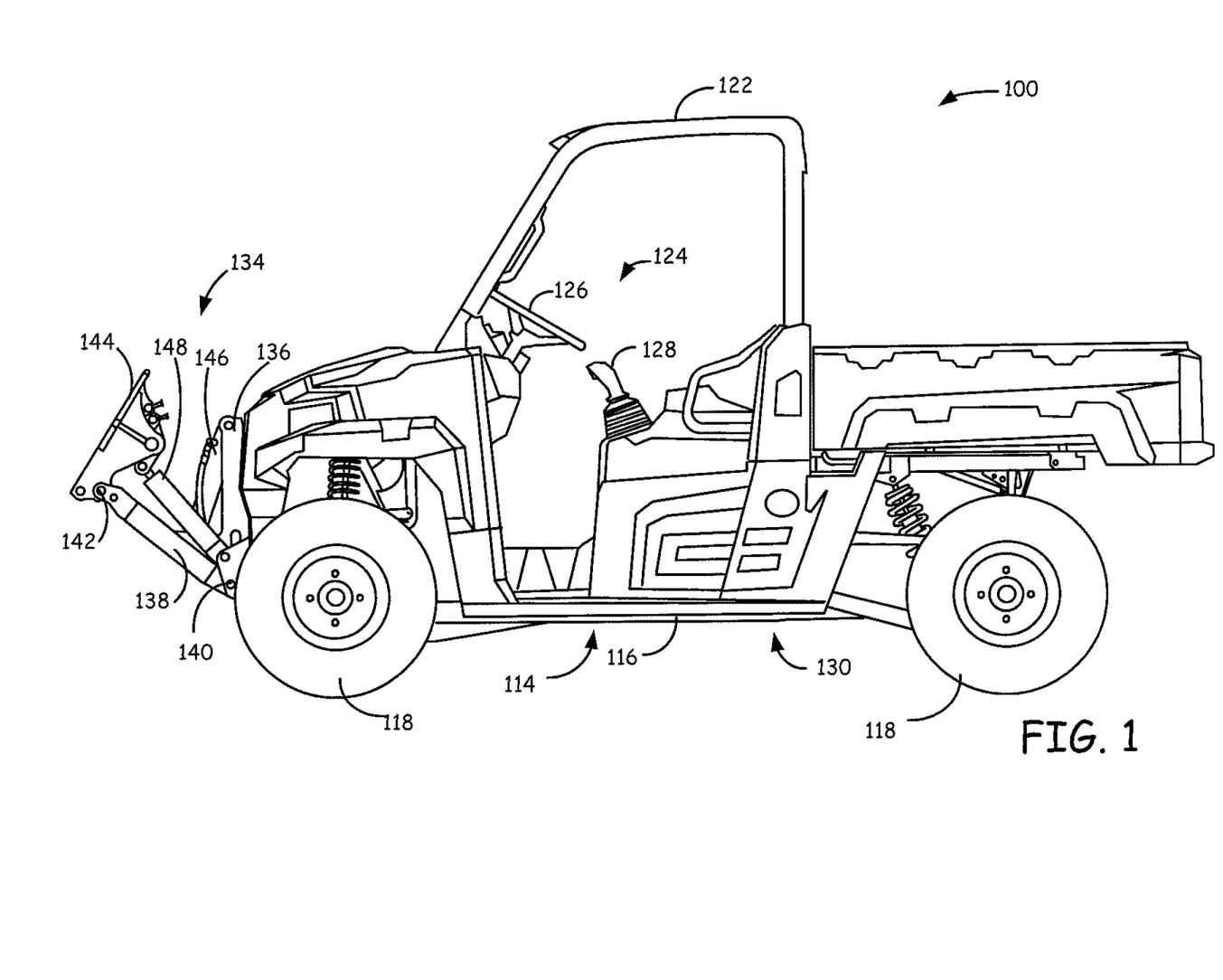
FIG. 1 is a left side view of a utility vehicle or power machine with a horsepower management system configured in accordance with disclosed embodiments.

A power machine 100 in the form of a utility vehicle is shown in FIG. 1 and is provided as one example of a type of power machine in which disclosed embodiments can be utilized. Other types of power machines on which the disclosed embodiments can be practiced include various types of loaders, excavators, telehandlers, and the like. Utility vehicle 100 includes a frame 114 having an undercarriage 116 supported for movement over the ground by front and rear pairs of tractive elements 118, which are illustratively shown in FIG. 1 as wheels, but can be other types of tractive elements such as powered tracks. An operator cab 122 that defines, at least in part, an operator compartment for carrying an operator, is mounted to the frame 114 and includes operator controls for controlling operation of the utility vehicle 100. Operator controls 124 are provided in the operator compartment for use by an operator to manipulate various operable systems on a utility vehicle. Examples of operator controls on utility vehicle 100 shown in FIG. 1 include a steering wheel 126 and a joystick 128. However, operator controls 124 can include any of a variety of different operator control device types such as foot pedals including those in the form of a treadle pedal, buttons, sliders, switches, touch sensitive display screens, rotatable devices that are incorporated into operator levers, handles, instrument panels, to name a few examples, and the illustrated operator controls 124 in the form of the steering wheel 126 and joystick 128 are shown to generally represent the various operator control types, but not to limit disclosed embodiments to specific types of operator controls. In an exemplary embodiment, a foot pedal is used to control a command lever of a horsepower management system, and a throttle user input provides an input for controlling engine speed. Such a horsepower management system configuration is described below in greater detail.

An engine, represented generally at reference number 130, is mounted to the frame 114 and provides a power source for moving the wheels 118 and also for other systems. Additionally, the engine 130 provides a power source to various utility vehicle components. In some embodiments, the engine 130 is an internal combustion engine. Alternatively, the engine can be a hydraulic engine, an electric generator, or other types of engines, or in some cases, the engine can be a collection of one or more power sources, such as an internal combustion engine and an electric generator, such as can be found in so-called hybrid vehicles.

The utility vehicle 100 also includes a lift arm structure 134 mounted to the frame 114. Lift arm structure 134, in the illustrative embodiment, is removable from the utility vehicle 100 so that the utility vehicle can optionally be operated without the lift arm structure 134. In other embodiments of power machines, various different types of lift arm structures can be employed, including lift arm structures that are integral to the machine, that is, they are not intended to be optionally removed. In some cases, a utility vehicle may not have a lift arm.

Lift arm structure 134 includes a mounting frame 136 that is rigidly mounted to the utility vehicle when the lift arm structure 134 is attached to the utility vehicle. One or more lift arms 138 (only one lift arm is shown in FIG. 1) are pivotally coupled to the mounting frame 136 on a first end of the lift arm along at pivot joint 140. A variety of different arrangements of lift arms can be employed in a lift arm structure for utility vehicles, including multiple arms, cross members rigidly attached to each arm and the like. For the purposes of this discussion, the term lift arm 138 refers generally to any configuration of lift arms that might be attached to the mounting frame 136. An implement carrier 144 capable of carrying an implement (not shown) is pivotally coupled to a second end of the lift arm 138 at pivot joint 142. The implement carrier 144 is capable of receiving and securing any of a wide variety of implements including, as some examples, buckets, sweepers, push blades, push brooms, pallet forks, mowers, and snowblowers, to name just a few to the utility vehicle 100. One or more actuators 146 are pivotally coupled between the mounting frame 136 and the lift arm 138 for raising and lowering the lift arm 138 in response to manipulation of operator controls 124 by an operator to control the position of the lift arm. In some embodiments, hydraulic cylinders are used as lift arm actuators, although other types of actuators can be employed. One or more actuators 148 can also be included for performing various operator controlled functions such as rotating or tilting the implement carrier 144 with respect to the lift arms 138, thereby causing any implement attached to the implement carrier to similarly rotate or tilt. The one or more actuators 148 are illustratively pivotally attached to one of the lift arms 138 and the implement carrier 144 or, in the case of various embodiments that do not have an implement carrier, to the implement itself. Other user controlled functions can be performed as well, such as control of various functions on some implements. Implements that have power devices to accomplish various work functions, such as a motor for driving a cutting tool or a sweeper, to name a few examples, can be controlled by a user via operator controls 124.

Figure 2:
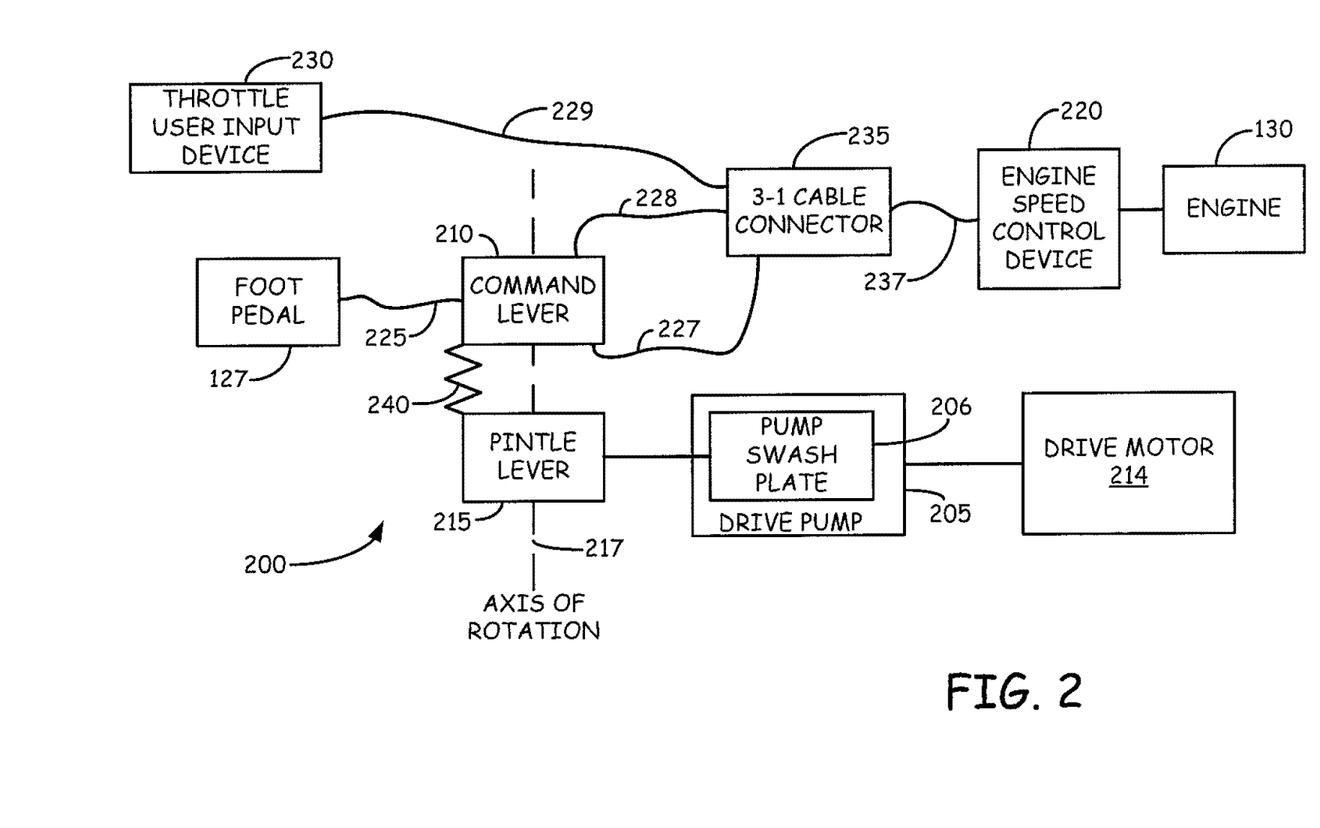
FIG. 2 is a diagrammatic illustration of component configurations in a horsepower management system.
Figure 3:
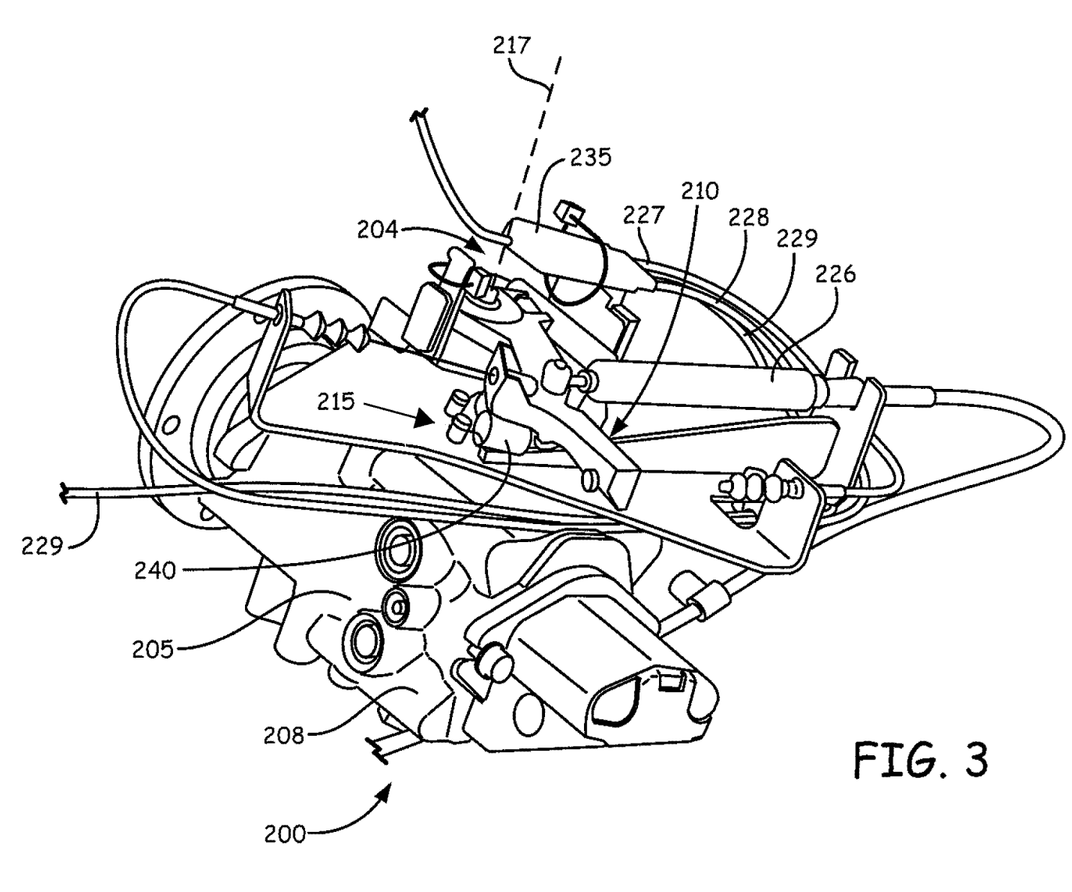
FIG. 3 is a perspective view illustration of portions of the horsepower management system components shown in FIG. 2.
Figure 8:
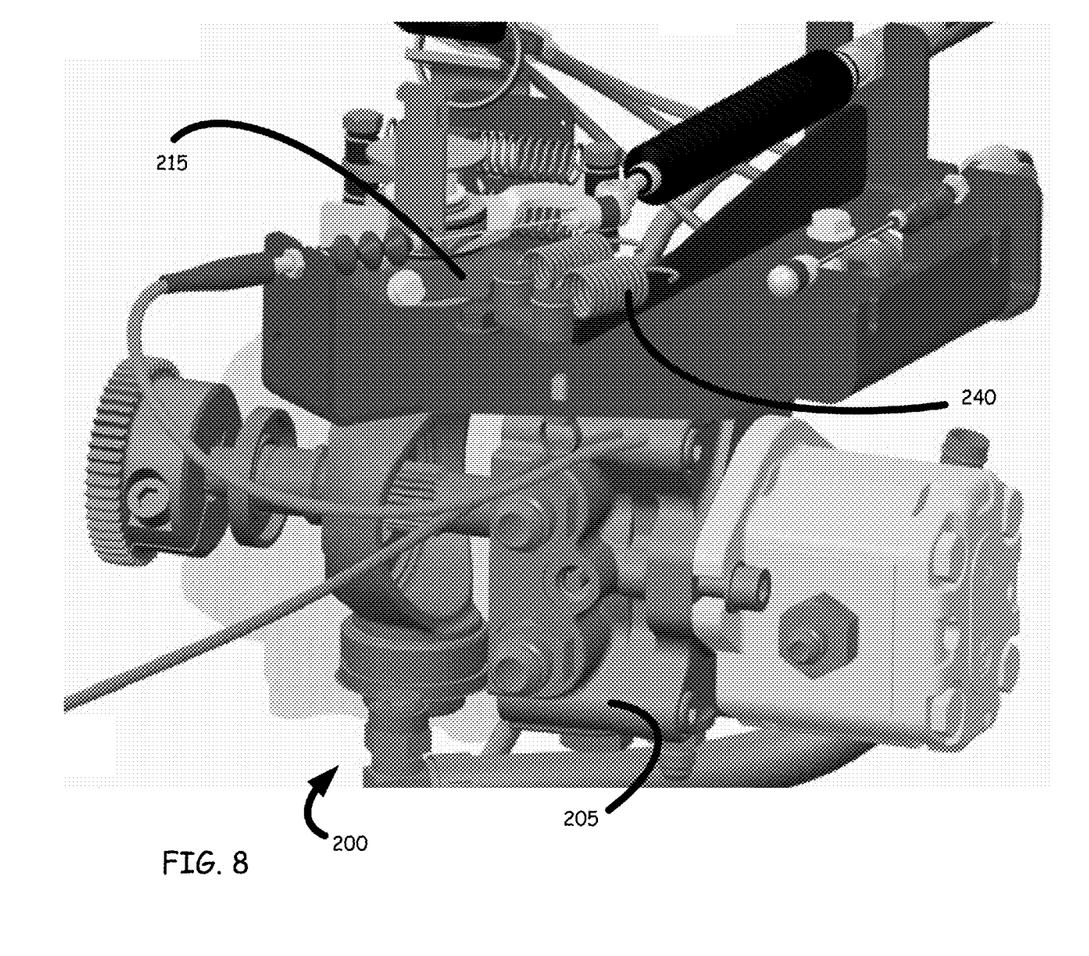
FIG. 8 is a perspective view illustration of portions of the horsepower management system components shown in FIG. 3, with a command lever removed to better illustrate a pintle lever and related components.

Referring now to FIGS. 2, 3 and 8, shown is control system 200 for use with a variable displacement hydrostatic pump 205. The hydrostatic pump 205 has a pintle 204 extending from a housing 208. The pintle 204 is rotatable about an axis 217 to control the displacement of hydrostatic pump 205, and thereby control the hydraulic fluid flow to a drive motor 214. In the control system, a command lever 210 and a pintle lever 215 are both rotatable about axis 217. The pintle lever 215 is coupled to the pintle 204 and rotation of the pintle controls a swash plate 206 of pump 205. Collectively, then, the pintle lever 215, pintle 204, and swash plate 206 operate as a displacement control member for controlling the displacement of the pump. The command lever 210 is coupled by cables and a cable connector to an engine speed control device 220 to aid in controlling engine speed of engine 130. In FIG. 8, the command lever 210 is removed to better illustrate pintle lever 215 and corresponding components.

A foot pedal 127 is actuable to influence both rotation of the pintle 204 and actuation of the engine speed control device 220. A cable 225 from the foot pedal 127 is shown attached to command lever 210 at cable connection 226 to influences a position of command lever 210. The foot pedal 127 also influences both the rotation direction and angle of pintle 204, thereby influencing the direction and amount of hydraulic flow provided by the drive pump 205 to the drive motor 214. First and second cables 227 and 228 are attached near first and second portions or ends of the command lever 210. A third cable 229 is connected with cables 227 and 228 to a three-in-one cable connector 235. The output cable 237 from cable connector 235 is coupled to the engine speed control device 220 to control the speed of engine 130. Third cable 229 is also attached to a manually actuable throttle input device 230, which in an example embodiment can correspond to input device 128 shown in FIG. 1. Each of the cables 237 and 229 are provided from operator inputs that can be manipulated to provide a control signal via cables 227 and 228 to the command lever 210.

As mentioned above, the pintle lever 215 is operably coupled to the swash plate 206 of the pump 205 via pintle 204. Rotation of the pintle lever 215 causes the swash plate angle to be changed, thereby affecting the output of pump 205. The command lever 210 is connected to the pintle lever 215 by a limiting mechanism, which in one embodiment includes one or more springs 240, which can be, in various embodiments, torsional, extension, or compression springs or any elastic device capable of temporarily deforming in high stress conditions. When the operator operates the travel pedal 127, the cable 225 from the travel pedal controls the command lever 210. As long as the drive pump forces on the pintle lever 215 are not enough to overcome the force from the limiting mechanism, the pintle lever 215 is rotated in response to the actuation of the command lever. In other words, the command lever commands a given displacement of the drive pump, subject to the load forces on the pump 205. As a load increases on the pump 205, corresponding load forces are transmitted to the pintle lever 215. When the forces are enough to overcome the spring 240, the pintle lever 215 de-strokes from the commanded position, i.e. the spring 240 allows movement of the pintle lever 215 relative to the command lever to reduce pump displacement in response to the load until the load decreases to the point that the forces on pintle lever 215 cannot overcome the spring forces. At such a point, pintle lever 215 is moved toward to the commanded level by the spring force. Because the engine speed is controlled by the position of the command lever 210 and not the position of the pintle lever 215, the engine throttle is not decreased when the pintle lever de-strokes from the commanded position due to high load forces on the pump. This configuration eliminates or reduces the need for experienced operators to compensate for heavy load conditions by manually reducing the input on the hydrostatic drive pumps by de-stroking the travel control input devices. In de-stroking the pump automatically using the disclosed configuration, the process can be better optimized and controlled. Further, the desired results can be achieved even with less experienced operators.

Figure 4:
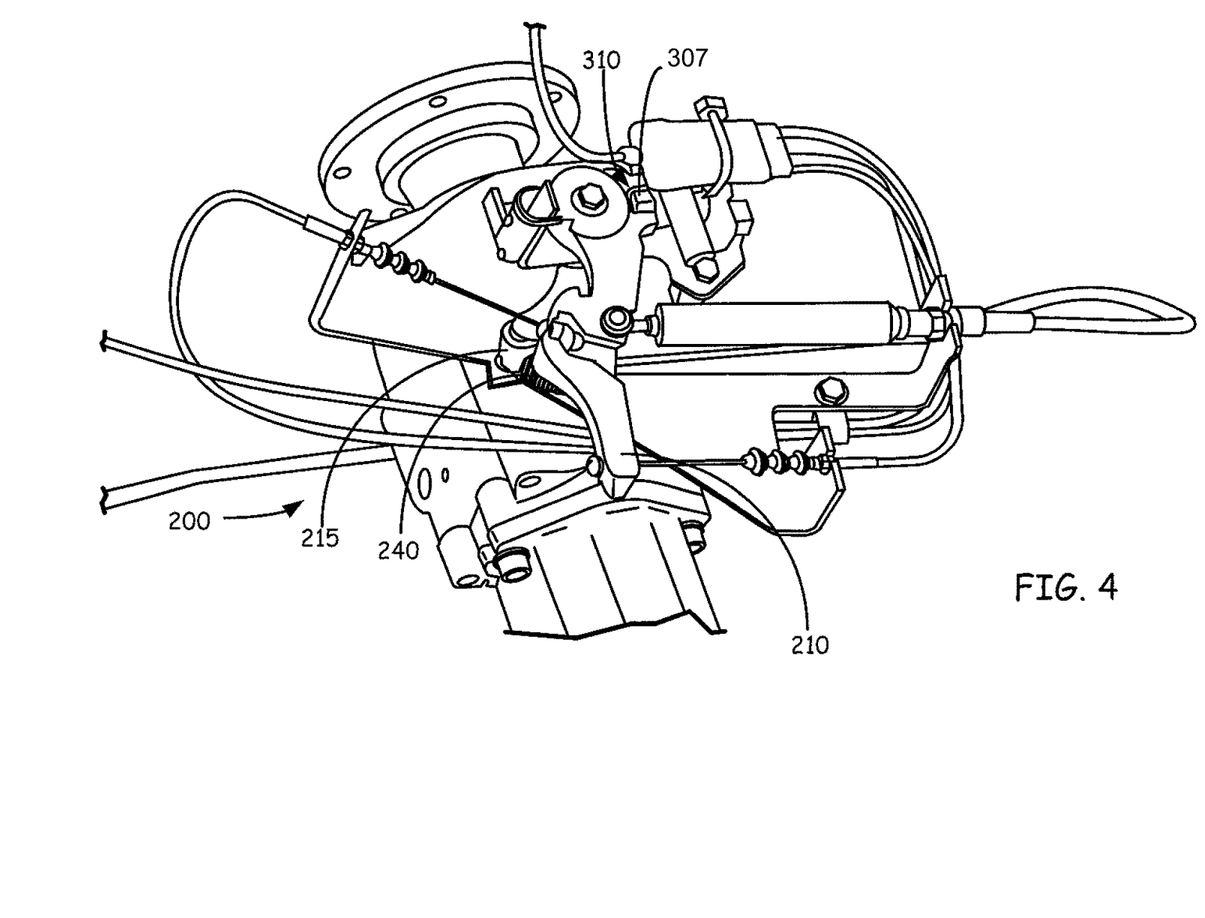
FIG. 4 is a perspective view illustration of portions of the horsepower management system components showing a further feature in accordance with an exemplary embodiment.

Referring now to FIG. 4, shown is another view of the pump 205 illustrating a further feature in some exemplary embodiments. As discussed above, when forces increase to the point where the spring 240 is overcome, the pintle lever 215 will de-stroke from the commanded position. However, it is not desirable to have the pump 205 de-stroke to the point where the machine is completely stopped. Therefore, a stop is put in place to limit how much the pump can be de-stroked. This is accomplished with a tab 307 that extends up from the pintle lever 215 to fit within a slot 310 formed in the pump command lever 210. When the pump de-strokes, this tab 307 engages slot 310, which prevents further de-stroking of the pump by preventing further movement of pintle lever 315 relative to command lever 210. This tab and slot arrangement acts as a limiter, thereby preventing de-stroking to the point where the vehicle 100 stops moving. Otherwise, the machine 100 could potentially repeatedly stop and start, resulting in horsepower not being effectively managed. The particular positions of tab 307 and slot 310 on the respective levers can be designed or chosen for particular minimum travel pump flow rates in some embodiments.

Figure 5:
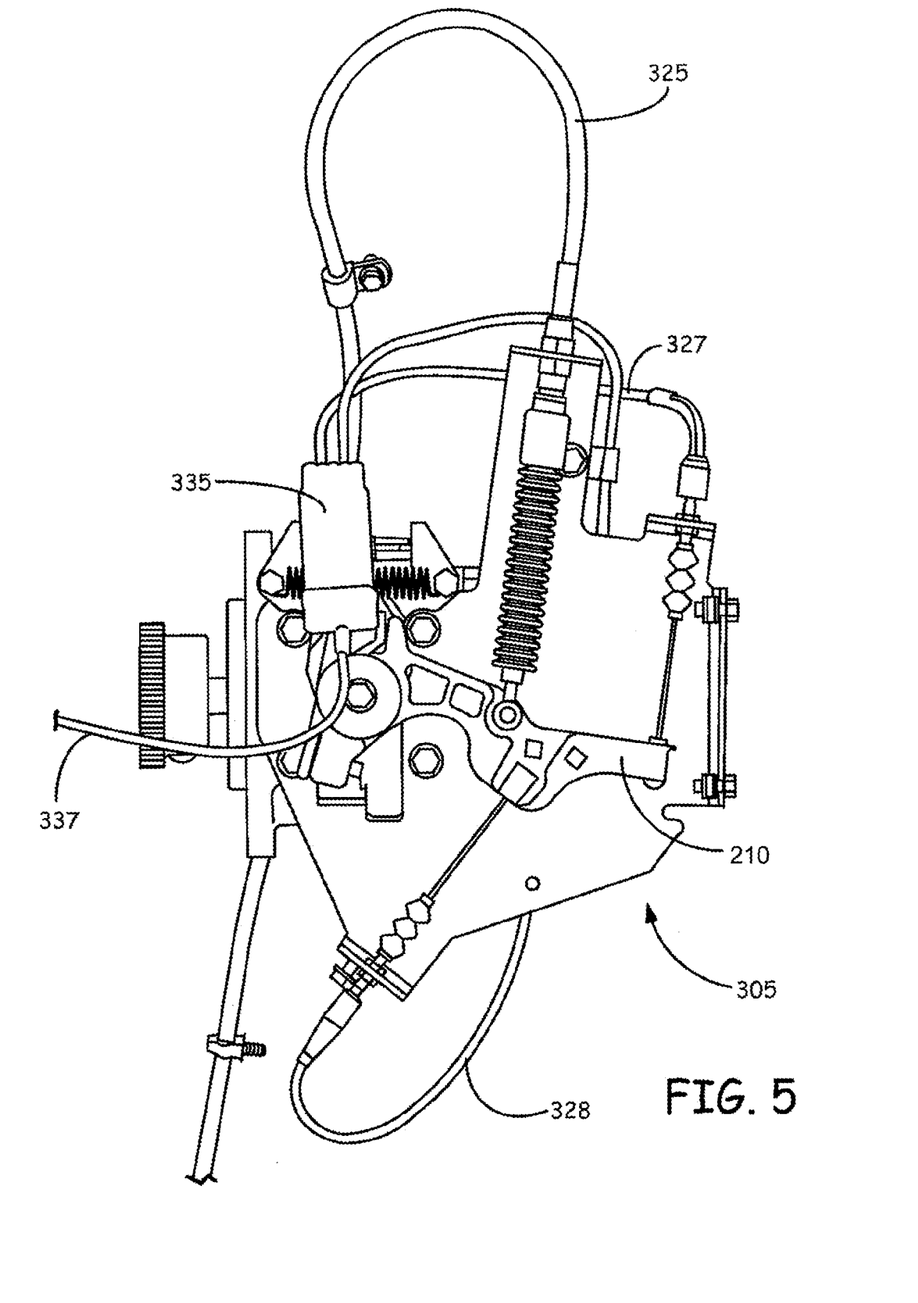
FIG. 5 is a top view of another drive pump assembly incorporating the concepts of a horsepower management system.
Figure 6:
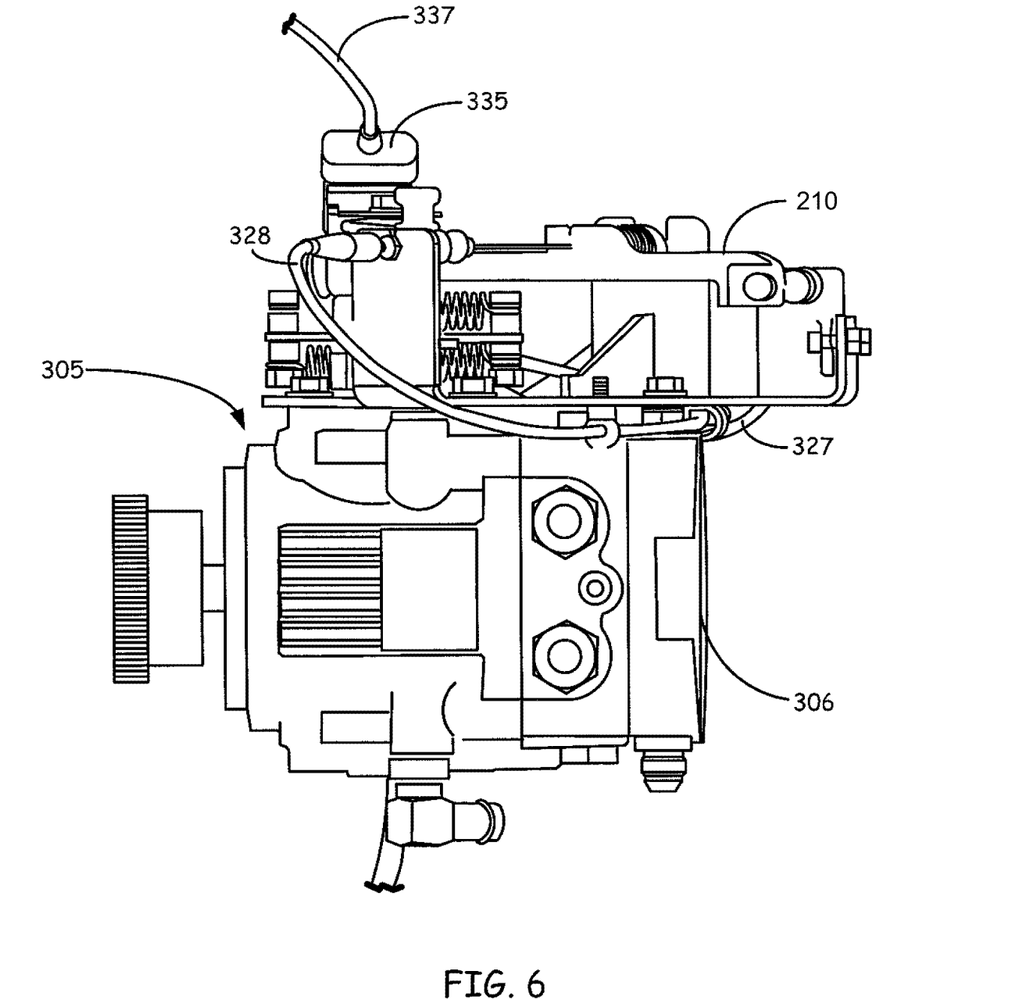
FIG. 6 is a side view of the drive pump assembly of FIG. 5.
Figure 7:
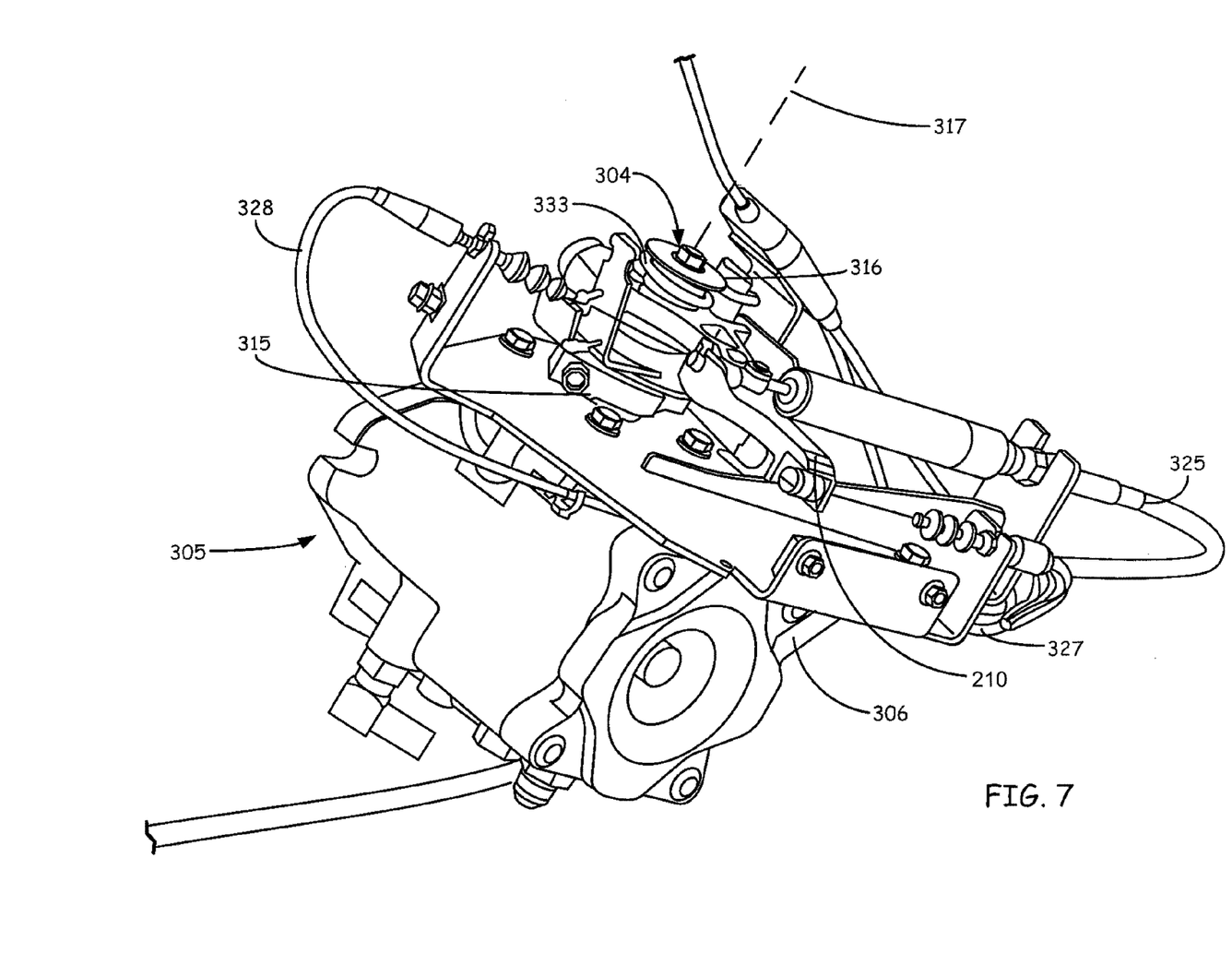
FIG. 7 is a perspective view of the drive pump assembly of FIG. 5.

FIGS. 5-7 illustrates a pump 305 employing some of the same concepts as pump 205 according to another illustrative embodiment. A pintle 304 is rotatable about an axis 317 to vary the displacement of the drive pump in response to an operator input by manipulating a swash plate located within the housing 306. Command lever 210 and pintle lever 315 rotate about axis 317. A torsional spring 333 is engaged with the command lever 210 and a tower portion 316 of the pintle lever 315 to transfer forces applied to the command lever 210 via a push-pull cable 325 to the pintle lever. Forces are applied to the command lever by, in one embodiment, actuating a treadle pedal (not shown), which is coupled to the push-pull cable 325.

First and second cables 327 and 328 are attached near first and second portions or ends of the command lever 210. A third cable (not shown) can be connected with cables 327 and 328 to a cable connector 335. The output cable 337 from cable connector 335 is coupled to control the speed of an engine according to inputs provided by one or more of cables 327, 328 and a third cable. The third cable can be also attached to a manually actuable throttle input device (not shown), if a third cable is provided.

The command lever 210 thus provides control of the engine speed and the pump displacement (and direction) as discussed above in previously discussed embodiments. Likewise, if forces on the drive pump become too high, the pintle can destroke, and like the embodiments above, a stop is in place to limit the amount of allowable destroke.

Although the subject matter has been described in language specific to structural features and/or methodological acts, it is to be understood that the concepts disclosed herein are not limited to the specific embodiments described. Rather, the specific features and acts described above are disclosed as example forms. For example, in various embodiments, different types of power machines can include the horsepower management system configuration to improve control of the machines under heavy load conditions. Other examples of modifications of the disclosed concepts are also possible, without departing from the scope of the disclosed concepts.

What is claimed is:

1. A power machine having an engine and a drive system powered by the engine, comprising:
    an engine speed control device coupled to the engine and configured to control engine speed;
    a variable displacement drive pump driven by the engine and having a displacement control member for controlling displacement of the drive pump;
    a drive motor that receives pressurized fluid from the drive pump; and
    a control system configured to communicate with the engine speed control device and the displacement control member, including:
        a user input device capable of providing a user input signal;
        a command lever rotatably coupled to the displacement control member and capable of receiving the user input, wherein the command lever provides an engine speed command signal to the engine speed control device in response to the user input;
        a limiting mechanism coupled to the command lever and the displacement control member;
        wherein the command lever commands a given displacement of the drive pump via the displacement control member in response to actuation of the user input subject to load forces on the drive pump transmitted to the limiting mechanism via the displacement control member.

2. The power machine of claim 1, wherein the command lever, displacement control member, and limiting mechanism are configured such that when load forces from the drive pump reach a given level, the limiting mechanism allows movement of the displacement control member relative to the command lever to reduce pump displacement in response to the load forces above the given level.

3. The power machine of claim 1, wherein the user input device is a foot pedal positioned in an operator compartment of the power machine.

4. The power machine of claim 1, wherein the command lever is coupled to the engine speed control device through first and second cables connected to first and second ends of the command lever, respectively.

5. The power machine of claim 1, wherein the user input device is mechanically coupled to the command lever.

6. The power machine of claim 1, wherein the limiting mechanism comprises a spring.

7. The power machine of claim 6, wherein the limiting mechanism comprises a torsional spring.

8. The power machine of claim 6, wherein the limiting mechanism is selected from one of an extension spring and a compression spring.

9. The power machine of claim 2, and further comprising a stop positioned to limit a reduction in the displacement of the drive pump via the limiting mechanism.

10. The power machine of claim 9, wherein the stop comprises one of a tab and a slot form on the displacement control member and the other of a tab and a slot formed on the command lever, wherein the tab engages the slot to limit movement of the displacement control member relative to the command lever via the limiting mechanism.

11. The power machine of claim 2, wherein when load forces from the drive pump reach the given level, the engine speed command signal is not reduced by the limiting mechanism.

12. A control system for controlling an engine and a hydrostatic pump of a power machine, a rotational speed of the engine being controlled by an engine speed control device in response to a user input, and displacement of the hydrostatic pump being controlled by a position of a swash plate actuated by a rotatable actuator, the control system comprising:
   a command lever rotatably coupled to the rotatable actuator and coupled to the user input and to the engine speed control device such that movement of the user input causes rotational movement of the command lever about the rotational actuator, the rotational movement of the command lever being transmitted to the engine speed control device to control the engine speed;
   a pintle lever fixed to the rotatable actuator such that rotation of the pintle lever controls the position of the swash plate; and
   a spring mechanism coupling the command lever to the pintle lever such that when the command lever is rotated by movement of the user input, the pintle lever is rotated to change the displacement of the hydrostatic pump subject to load forces on the hydrostatic pump transmitted to the spring mechanism that limit rotation of the pintle lever in response to rotation of the command lever.

13. The control system of claim 12, wherein the command lever, pintle lever and spring mechanism are configured such that when load forces from the hydrostatic pump surpass a given level, the spring mechanism allows movement of the pintle lever relative to the command lever to reduce the displacement of the hydrostatic pump when the load forces remain above the given level.

14. The control system of claim 12, wherein the command lever is coupled to the engine speed control device through first and second cables connected to first and second ends of the command lever, respectively.

15. The control system of claim 12, wherein the command lever is mechanically coupled to the user input device.

16. The control system of claim 12, wherein the spring mechanism comprises a torsional spring.

17. The control system of claim 12, wherein the spring mechanism comprises one of an extension and a compression spring.

18. The control system of claim 13, and further comprising:
   a stop positioned to limit movement of the pintle lever relative to the command lever in response to load forces transmitted to the spring mechanism.

19. The control system of claim 18, wherein the stop comprises a tab on one of the pintle lever and the command lever and a slot formed in the other of the pintle lever and the command lever, and wherein the tab engages the slot to prevent further movement of the pintle lever relative to the command lever.

20. The control system of claim 12, wherein the transmission of rotational movement from the command lever to the engine speed control device is unaffected by the spring mechanism.

* * * * *